United States Patent [19]
Dridi et al.

[11] Patent Number: 5,722,462
[45] Date of Patent: Mar. 3, 1998

[54] FLEXIBLE HEAT INSULATED FLUID CONDUIT

[76] Inventors: Hamadi Dridi, 7, Avenue de la Porte de Choisy, 75013, Paris, France; Bernard Dewimille, 8, Rue Vlaminck, 91350, Grigny, France

[21] Appl. No.: 607,439

[22] Filed: Feb. 27, 1996

Related U.S. Application Data

[63] Continuation of Ser. No. 380,265, Jan. 26, 1995, abandoned, which is a continuation of Ser. No. 834,371, Feb. 12, 1992, abandoned, which is a continuation-in-part of Ser. No. 450,423, Dec. 14, 1989, abandoned, which is a continuation-in-part of Ser. No. 829,145, Dec. 26, 1985, Pat. No. 4,921,018.

[30] Foreign Application Priority Data

Apr. 25, 1984 [FR] France ................. 84 06483

[51] Int. Cl.$^6$ ........................................ F16L 9/14
[52] U.S. Cl. ........................ 138/149; 138/148; 285/47
[58] Field of Search ........................... 138/137, 148, 138/149, DIG. 9; 285/47, 55

[56] References Cited

U.S. PATENT DOCUMENTS

| | | | |
|---|---|---|---|
| 2,797,731 | 7/1957 | Carlson, Jr. ........................ | 154/41 |
| 2,857,931 | 10/1958 | Lawton ................................ | 138/64 |
| 4,005,234 | 1/1977 | Stroupe .......................... | 138/127 X |
| 4,157,101 | 6/1979 | Ross .................................. | 138/130 |
| 4,168,014 | 9/1979 | Schultz et al. ................. | 138/149 X |
| 4,307,756 | 12/1981 | Voigt et al. .................... | 138/149 |
| 4,380,253 | 4/1983 | Mead et al. ..................... | 138/149 |
| 4,417,603 | 11/1983 | Argy ................................ | 138/149 |
| 4,590,118 | 5/1986 | Nippe ........................... | 138/150 X |
| 4,706,711 | 11/1987 | Czvikovsky et al. ............ | 138/103 |
| 4,921,018 | 5/1990 | Dridi et al. ..................... | 138/149 |

FOREIGN PATENT DOCUMENTS

| | | |
|---|---|---|
| 1239397 | 7/1971 | United Kingdom . |
| 1253473 | 7/1971 | United Kingdom . |

*Primary Examiner*—Patrick F. Brinson
*Attorney, Agent, or Firm*—Hoffman, Wasson & Gitler

[57] ABSTRACT

A flexible, thermally insulated fluid conduit including a central pipe, which is spirally wrapped with thermal strip insulation under plastic deformation of an amount not exceeding 10%. The insulation is covered with an extruded, continuous casing.

10 Claims, 2 Drawing Sheets

FLEXIBLE HEAT INSULATED FLUID CONDUIT

This application is a continuation of application Ser. No. 08/380,265 filed Jan. 26, 1996 now abandoned, which is a continuation of application Ser. No. 07/834,371 filed Feb. 12, 1992 now abandoned, which is a continuation in part of application Ser. No. 07/450,423 filed Dec. 14, 1989 now abandoned, which is a continuation-in-part of application Ser. No. 06/829,145 filed Dec. 26, 1985, now U.S. Pat. No. 4,921,018.

The presents invention relates to a heat insulated line or conduit for the transport of fluids, usable in particular but not exclusively for transporting hydrocarbon products from undersea wells.

The problem of thermal insulation of undersea production conduits arises in particular in the exploitation of deposits of heavy oils which risk congealing during their transport between the well and the platform, due to heat losses in the line surrounded by sea water, thermal insulation also being necessary to prevent the formation of hydrates, which certain crude oils are subject to do during chilling.

It has already been proposed to make thermal insulated conduits comprising an essentially central pipe or core, whose outer wall is surrounded concentrically by an also rigid tubular casing, and in which insulation material, such as a polyurethane foam, is injected in the annular space around the outer surface of the core. This injection of foam can be carried out either on land or on a barge or ship. It is established in practice that such foam injections are difficult to perform on board ship before the line is installed or laid, and when injections are carried out on land, significant problems arise concerning the handling of the resulting rigid line. Another disadvantage of the lines made up to the present, is their low resistance to crushing, generally not exceeding 5 bars, which is insufficient to resist outside pressures and in particular the hydrostatic pressure which under modern conditions of exploitation can be greater than 20 bars.

The present invention proposes to provide a thermally insulated line comprising around a flexible pipe or core a thermal insulating structure offering in particular good resistance to outside pressures in particular with respect to crushing, having a low coefficient of thermal conductivity, able to maintain its physical properties in the presence of sea water and having very low water absorption, even under pressure and at relatively high temperature, especially on the order of 60° to 100° C.

In the present application, the term "flexible" is intended to designate any structure, even a rigid one, able to be wound without damage on small reels or drums whose diameter does not exceed 10 m.

The invention is more particularly applicable with flexible pipes or cores comprising an inner sealed casing, reinforcing sheathing and an outer protective casing. These pipes can also comprise a metal carcass for resistance to crushing. Such pipes are made and sold in long lengths and in different diameters by Societe Coflexip.

The line or conduit according to the invention comprises, around the inner pipe or core, an outer continuous extruded casing concentric to the inner pipe or core, an insulation material filling the annular space between the inner pipe and the casing. The insulating material is made of at least one layer of an insulating strip applied about the pipe and over the entire length of the pipe by being wound under plastic deformation of an amount not exceeding 10% and spiralled with clearance so as to not restrict the flexibility of the pipe.

The strip is made of an expanded plastic material having a density above 0.25 g/cm$^3$, a good resistance to creeping, low thermal conductivity low water absorption, and the ability to maintain its physical properties in the presence of sea water.

The strip is made of a plastic material such as polyvinyl chloride (PVC) or chlorinated polyvinyl chloride (PVC).

Further, the expanded plastic material has a crush resistance of at least 40 bars, at 10% deformation and can withstand temperatures of 60° C. to 100° C.

The insulating material is made of long lengths of expanded plastic material and can be produced by extrusion.

In another preferred embodiment, there is provided a continuous tubular cover around the pipe. The insulating strip is spirally wound around the cover.

Additionally, if desired, annular partitions can be provided to divide the insulating material into annular chambers. The partitions and the insulating material is surrounded by the outer continuous extruded casing which is fixed thereto.

For the execution of spiralling a band can be used, of polyvinyl chloride (PVC) or chlorinated polyvinyl chloride (CPVC), expanded obtained by extrusion, which is applied on the inner core by deformation. Such shaped parts in the form of strips of bands are given, for example, a width on the order of 0.5 to 10 cm and a thickness on the order of 5 to 30 mm, the value of the plastic deformation varying from 2 to 10% according to the thickness of the shaped part and the diameter of the core. Such shaped parts have a high resistance to stretching allowing them to be spiralled by a winding machine, starting from reels or coils on which the shaped parts are stored in very long length. The joining or splicing is done by gluing.

The spiralling is carried out with a certain play or clearance which gives the conduit structure a great flexibility, compatible, should the occasion arise, with that of the inner conduit or core.

Thus according to the invention it is possible to make especially flexible heat insulated conduits of great lengths.

Other advantages and characteristics of the invention will appear in the following description of particular embodiments given as non-limiting examples and with reference to the attached drawings on which:

Figure 1:
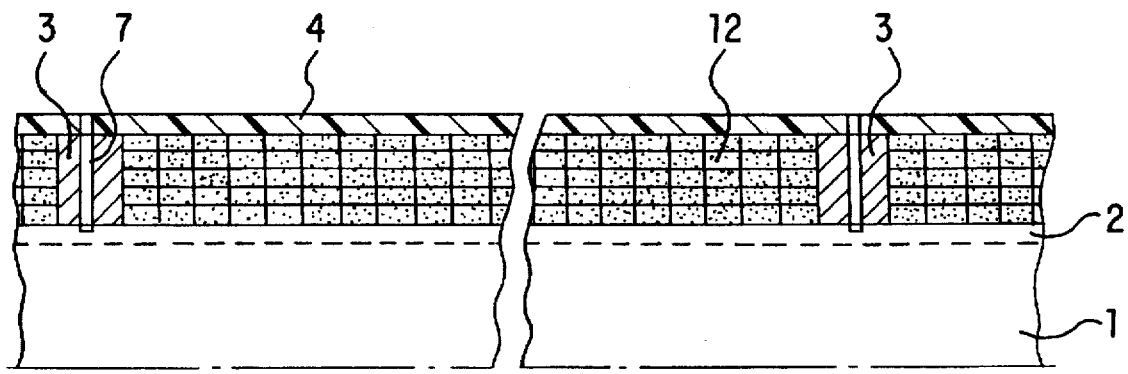
FIG. 1 is a fragmentary and schematic view of a line or conduit according to a first embodiment.

Reference will first be made to FIG. 1.

The line or conduit shown on this figure comprises an inner pipe or core 1 provided with an outer protective covering 2 made of a flexible material such as a polyamide or polyethylene.

Around the core 1 there are placed on the outer covering 2 of the core, a plurality of annular walls or partitions 3 in the form of disks. Use and placement of these partitions 3, is optional. These partitions 3 in the form of disks are used in one particular embodiment, and can be a polyurethane having a Shore A hardness of between 70 and 90, and can be placed on the core with predetermined spacing, for example, on the order of 2 meters in the present example.

The line or conduit according to the invention comprises an outer casing 4 continuously extruded and secured to or joined with the peripheral surfaces of the insulation material 12 and if selected the partitions 3.

The embodiment according to FIG. 1 illustrates that the insulation material designated by 12 is put in place by spiralling of bands or of shaped parts such as those described above, wound on the core by plastic deformation.

Such shaped parts, presently known, have a crush deformation of 10%, at on the order of 40 to 100 bars, a low thermal conductivity, a density generally between 0.25 and 0.6 grams per cm³, good resistant to creeping, and very low or non-existent absorption of water.

The manufacture of a line or conduit according to FIG. 1 will be described in greater detail below with reference to FIGS. 2 to 5.

In the conduit according to FIG. 1, the annular partitions 3 can be spaced at relatively large intervals, for example, on the order of 20 meters.

It is also possible to envisage spiralled insulation materials with different pitches.

One preferred process for manufacturing a conduit according to one embodiment of the invention will now be described with reference to FIGS. 2 to 5.

Figure 2:
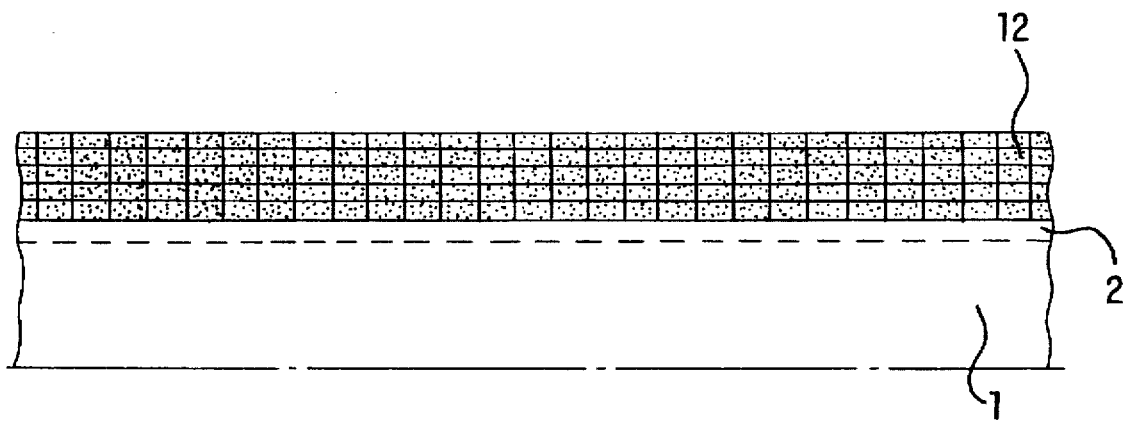
FIGS. 2–5 show different phases of making a conduit according to this embodiment.

As shown in FIG. 2, there is first installed by spiralling around the outer cover 2 of core 1 the insulation material 12, over the entire length of the core. In one particular example of an embodiment, for a core with a diameter of 240 mm, insulation with a thickness of 40 mm is formed.

Figure 3:
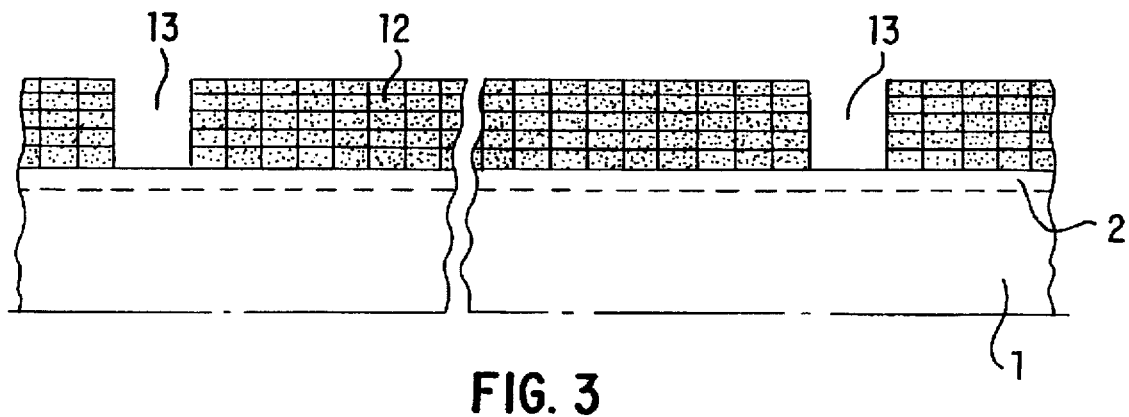
Figure 4:
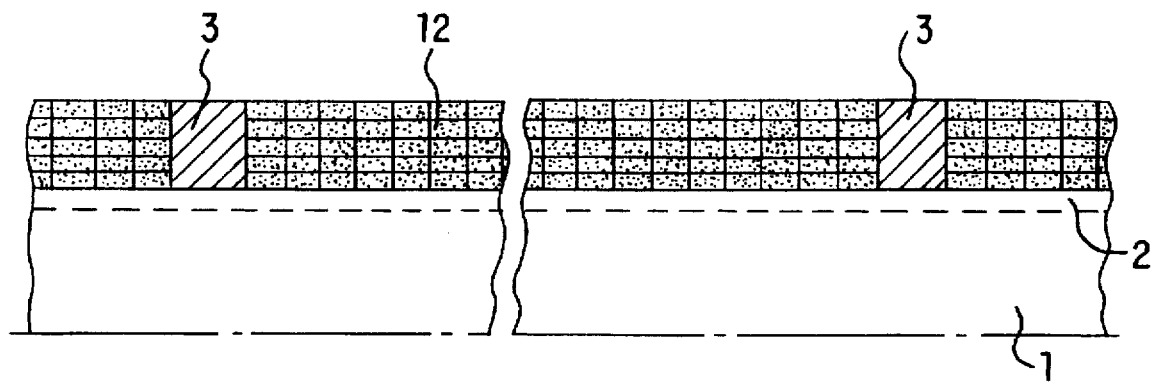
Figure 5:
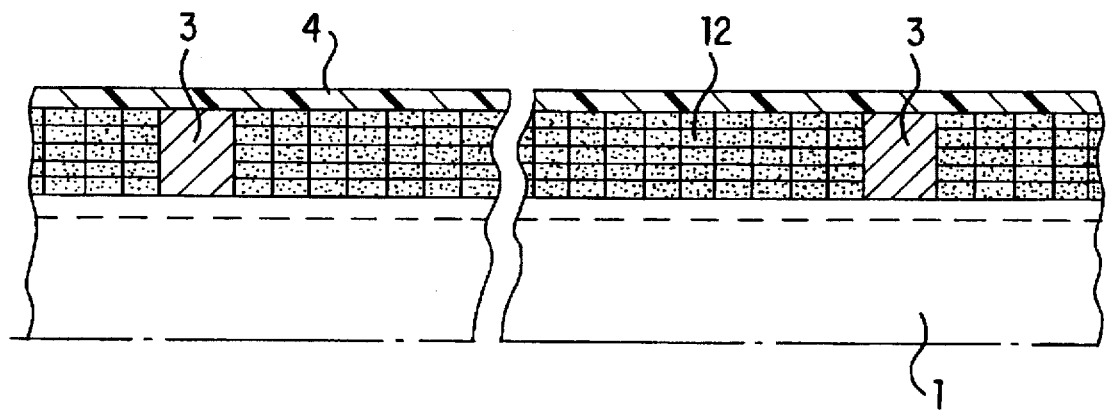

The next optional step consists, as shown on FIG. 3, of cutting out at appropriate intervals, rings 13 of the insulation 12.

In the example of this embodiment, rings are cut out which have a thickness of 150 mm, and are spaced every 100 meters.

The cut walls of insulation are then sealed at the level of the rings 13 by means of an appropriate mastic.

If the occasion arises in which the partition to be installed must have a passage for gas removal, there is made at the base of each ring 13 a groove in the cover 2 of the core.

By means of an appropriate solvent, the outer surface of the cover 2 of the core is cleaned and an appropriate primer is applied to this surface. Then the annular partitions 3 are molded. After the molding of each partition, which is done by positioning an appropriate mold, the outer surface of the assembly consisting of the core provided with the insulation and the partitions is cleaned with an appropriate solvent, essentially to remove the mold stripping agent. Next a thermo-melt cement is applied on the periphery of the assembly and an outer casing, preferably of polyamide or polyethylene, is extruded at a high temperature, on the order of 180° C., fusing the thermo-melt cement and ensuring the adherence of the casing to the partitions.

Although the invention has been described in connection with particular embodiments, it is of course evident that it is in no way thereby limited and can undergo numerous variations and modifications without exceeding either its scope or its spirit.

What is claimed is:

1. A flexible, thermally insulated fluid conduit, comprising:

an inner central pipe through which fluids can flow, an outer continuous extruded casing concentric to said pipe, an insulating material filling annular space between said pipe and said casing, said insulating material being made of at least one layer of an insulating strip applied about said pipe by being wound under plastic deformation of an amount from 2 to 10% and spiralled with clearance so as not to restrict the flexibility of said pipe, said strip being made of an expanded plastic material having a density above 0.25 g/cm³, low thermal conductivity, good resistance to creeping, low water absorption, and the ability to maintain its physical properties in the presence of sea water, wherein said expanded plastic material has a crush resistance, at 10% deformation, of at least 40 bars.

2. The invention of claim 1, wherein said plastic material is chosen from the group consisting of polyvinyl chloride and chlorinated polyvinyl chloride.

3. The invention of claim 1, wherein said expanded plastic material is able to withstand temperatures of up to between 60° C. and 100° C.

4. The invention of claim 1, wherein said strip has a thickness of less than 30 mm.

5. The invention of claim 1, wherein said strip has a thickness of about 5 mm.

6. The invention of claim 1, wherein said insulating material is made of long lengths of expanded plastic material produced by extrusion.

7. The invention of claim 1, further comprising a continuous tubular cover around said pipe, said insulating strip being wound around said cover.

8. The invention of claim 7, further comprising at least one annular partition dividing said insulating material into separate and annular chambers, said partitions and said chambers being surrounded by said outer continuous extruded casing.

9. A flexible, thermally insulated fluid conduit, comprising:

an inner central pipe through which fluids can flow, an outer continuous extruded casing concentric to said pipe, an insulating material filling an annular space between said pipe and said casing, said insulating material being made of at least one layer of an insulating strip applied about said pipe by being spiralled with clearance so as not to restrict the flexibility of said pipe, said strip being made of an expanded plastic material chosen from the group consisting of polyvinyl chloride and chlorinated polyvinyl chloride.

10. A flexible, thermally insulated fluid conduit, comprising:

an inner central pipe through which fluids can flow, an outer continuous extruded casing concentric to said pipe, an insulating material filling annular space between said pipe and said casing, said insulating material being made of at least one layer of an insulating strip applied about said pipe by being wound under plastic deformation of an amount from 2 to 10% and spiralled with clearance so as not to restrict the flexibility of said pipe, said strip being made of an expanded plastic material having a density above 0.25 g/cm³, low thermal conductivity, good resistance to creeping, low water absorption, and the ability to maintain its physical properties in the presence of sea water, wherein said insulating material is made of long lengths of expanded plastic material produced by extrusion.

* * * * *